United States Patent [19]
Jentsch et al.

[11] Patent Number: 5,535,862
[45] Date of Patent: Jul. 16, 1996

[54] SUSPENSION STRUT WITH QUIET REBOUND STOP

[75] Inventors: Erwin Jentsch, Riedstadt; Hartmut Wollstadter, Florsheim, both of Germany

[73] Assignee: ACG Deutschland GmbH, Russelsheim, Germany

[21] Appl. No.: 374,460

[22] Filed: Jan. 18, 1995

[30] Foreign Application Priority Data

Apr. 15, 1994 [GB] United Kingdom .................. 9407455

[51] Int. Cl.⁶ ........................................................ F16F 9/48
[52] U.S. Cl. ........................ 188/284; 188/322.22; 267/220
[58] Field of Search ........................................ 207/201, 220, 207/219, 202, 35; 188/281, 284, 322.17, 322.19, 322.22

[56] References Cited

U.S. PATENT DOCUMENTS

| | | | |
|---|---|---|---|
| 4,328,960 | 5/1982 | Handke et al. | 188/284 |
| 4,383,595 | 5/1983 | Schnitzius | 188/284 |
| 4,934,667 | 6/1990 | Pees et al. | 267/64.21 |
| 5,000,429 | 3/1991 | Wittmar et al. | 267/220 |
| 5,005,811 | 4/1991 | Harrison | 267/220 |
| 5,024,301 | 6/1991 | Cook | 188/284 |
| 5,174,603 | 12/1992 | Lund | 280/772 |
| 5,224,413 | 7/1993 | Herner | 188/322.22 |

FOREIGN PATENT DOCUMENTS

| | | |
|---|---|---|
| 0259010 | 3/1988 | European Pat. Off. . |
| 887191 | 1/1962 | United Kingdom . |
| 2039664 | 8/1980 | United Kingdom . |
| 2107821 | 5/1983 | United Kingdom . |
| WO84/01198 | 3/1984 | WIPO . |

*Primary Examiner*—Matthew C. Graham
*Attorney, Agent, or Firm*—Jeffrey A. Sedlar

[57] ABSTRACT

A suspension strut comprising a tube substantially closed at both ends and containing fluid; a piston assembly slidably mounted in the tube and making a sealing fit therewith, the piston assembly separating a compression chamber and a rebound chamber within the tube; a piston rod attached to the piston assembly and extending through the rebound chamber and out of one end of the tube; and a rebound stop mounted on the piston rod between the piston assembly and said one end of the tube, the rebound stop comprising a substantially rigid metallic ring secured to the piston rod and an annular bumper compressible between the metallic ring and the said one end of the tube during a rebound stroke, wherein the rebound stop and/or the one end of the tube is such as to alter the normal compression characteristics of the bumper on initial contact and compression of the bumper.

14 Claims, 4 Drawing Sheets

SUSPENSION STRUT WITH QUIET REBOUND STOP

BACKGROUND OF THE INVENTION

The present invention relates to a suspension strut or damper for a motor vehicle.

Known suspension struts comprise a tube; a piston sealably slidably mounted in the tube and attached to a piston rod, the piston separating a compression chamber from a rebound chamber within the tube; a compression stroke valve mounted on the piston; and a rebound stroke valve mounted on the piston. The compression stroke valve acts as a one way valve to allow flow of fluid from the compression chamber to the rebound chamber through one or more compression flow passages in the piston during the compression stroke of the suspension strut. The rebound stroke valve acts as a one way valve which allows flow of fluid from the rebound chamber to the compression chamber through one or more rebound flow passages in the piston during the rebound stroke of the suspension strut. The piston rod extends out of the tube at one end thereof, and is sealably slidably mounted in that one end. A rebound stop is attached to the piston rod between the piston and the one end of the tube. The rebound stop limits the movement of the piston towards the one end of the tube during the rebound stroke of the suspension strut. Typically, the rebound stop comprises a rigid metal ring which is secured to the piston rod on the piston side of the rebound stop, and an annular bumper of elastomeric material which is engageable with the one end of the tube. During a rebound stroke, the bumper is compressed between a substantially flat surface at the one end of the tube and a substantially flat surface on the metal ring. This arrangement has the disadvantage that a noise can be generated on initial contact and compression of the bumper.

SUMMARY OF THE INVENTION

It is an object of the present invention to provide a suspension strut which overcomes the above mentioned disadvantage.

The present invention is particularly for a suspension strut comprising an inner tube and an outer tube (sometimes referred to as a twin tube damper) in which the piston slides in the inner tube, although the invention may also be used in a suspension strut having a single tube (sometimes referred to as a monotube damper).

A suspension strut in accordance with the present invention comprises a tube substantially closed at both ends and containing fluid; a piston assembly slidably mounted in the tube and making a sealing fit therewith, the piston assembly separating a compression chamber and a rebound chamber within the tube; a piston rod attached to the piston assembly and extending through the rebound chamber and out of one end of the tube; and a rebound stop mounted on the piston rod between the piston assembly and said one end of the tube, the rebound stop comprising a substantially rigid metallic ring secured to the piston rod and an annular bumper compressible between the metallic ring and the said one end of the tube during a rebound stroke, wherein the rebound stop and/or the one end of the tube is such as to alter the normal compression characteristics of the bumper on initial contact and compression of the bumper.

By "normal compression characteristics" is meant the compression characteristics of the bumper when it is compressed between two substantially flat and parallel surfaces.

The present invention provides a smoother start to the compression curve of the bumper, thereby substantially reducing or removing noise relative to prior known arrangements.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENTS

Figure 1:
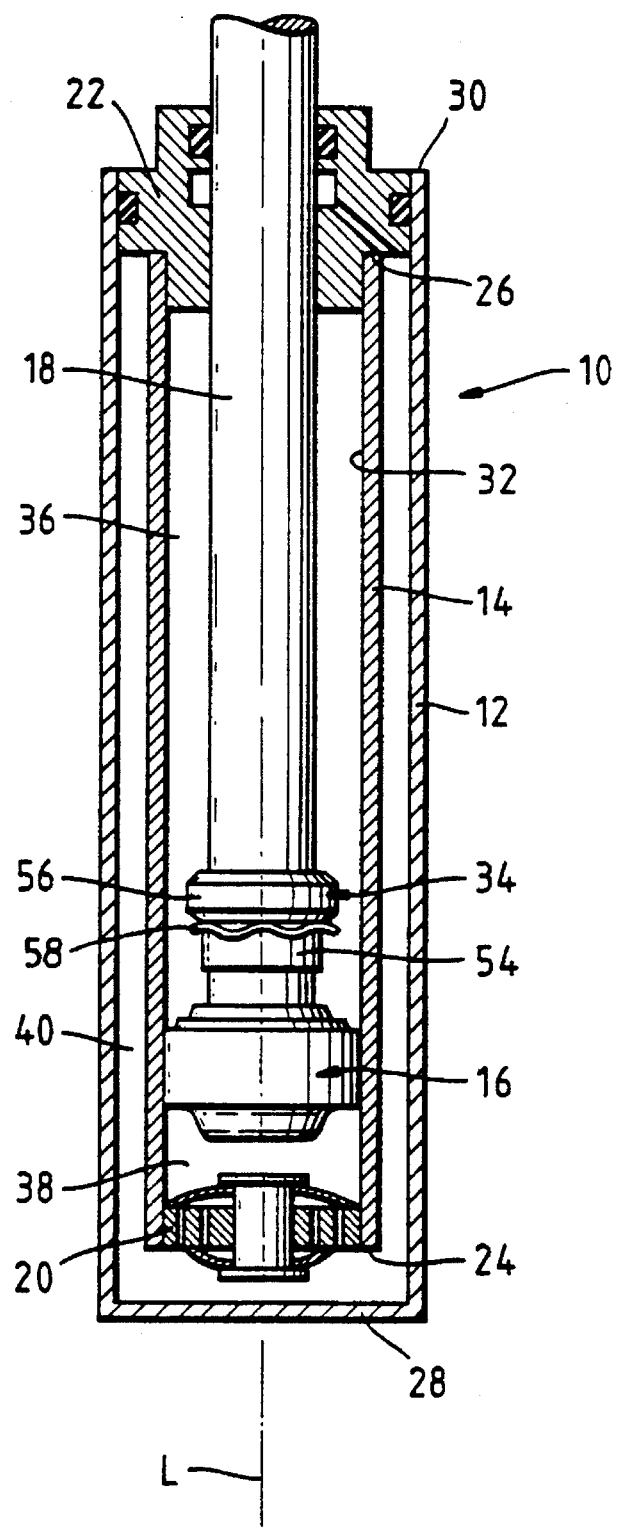
FIG. 1 is a cross-sectional view of a suspension strut in accordance with the present invention.
Figure 2:
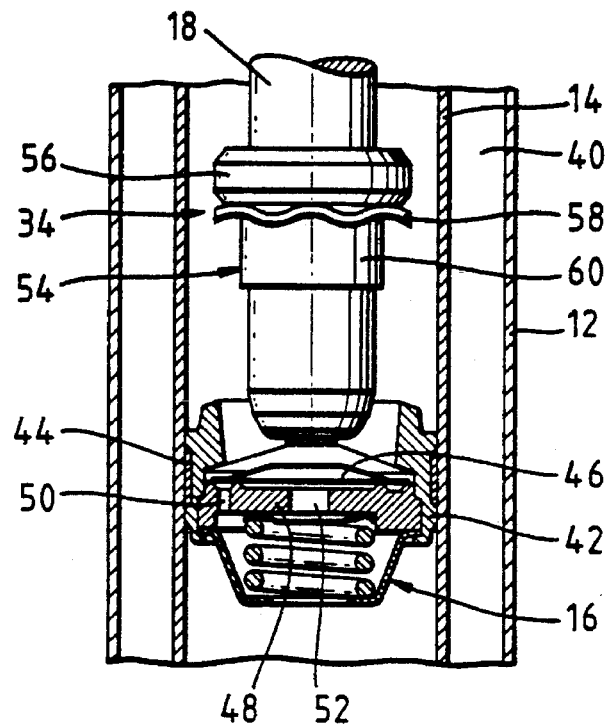
FIG. 2 is an enlarged side view of the metallic ring and bumper of the rebound stop of the suspension strut of FIG. 1.

Referring to FIGS. 1 and 2 of the drawings, the suspension strut 10 is of the twin tube damper type, and comprises an outer tube 12, an inner tube 14 substantially coaxial with the outer tube on an axis L, a piston assembly 16, a piston rod 18 having a longitudinal axis on axis L, a compensation valve 20, a rod guide 22, and a rebound stop 34. The compensation valve 20 and the rod guide 22 may be any suitable conventional design well known to those skilled in the art, and will not be described in detail. The piston assembly 16 may also be of any suitable conventional design well known to those skilled in the art, and the arrangement shown in FIG. 1 will be described in greater detail below. The rebound stop 34 of the present invention will also be described below in greater detail.

The inner tube 14 is substantially closed at one end 24 by the compensation valve 20, and is substantially closed at the other end 26 by the rod guide 22. The outer tube 12 is closed at one end 28 by an integral formation of the outer tube walls, and is substantially closed at the other end 30 by the rod guide 22. The piston rod 18 extends through, and makes a sealing sliding fit with, the rod guide 22. The piston assembly 16 makes a sealing sliding fit with the inner surface 32 of the inner tube 14 and is secured to one end of the piston rod 18. The piston assembly 16 divides the inner area of the inner tube 14 into a rebound chamber 36 and a compression chamber 38. The area between the inner tube 14 and the outer tube 12 defines a compensation chamber 40. The rebound and compression chambers 36 and 38 are substantially filled with fluid to damp reciprocating movement of the piston assembly 16 and piston rod 18 along axis L relative to the outer and inner tubes 12 and 14. The compensating chamber 40 is partly filled with fluid and acts as a reservoir for the fluid in the rebound and compression chambers 36 and 38. The suspension strut 10 is mounted in a motor vehicle (not shown) in any standard manner.

The piston assembly 16 is shown in greater detail in FIG. 2 and comprises a piston 42 of sintered steel, an annular seal 44 made from Teflon® material, a compression stroke valve 46, and a rebound stroke valve 48. The compression stroke valve 46 acts as a one way valve to allow flow of fluid from the compression chamber 38 to the rebound chamber 36 through one or more compression flow passages 50 in the piston 42 during the compression stroke of the suspension strut 10. The rebound stroke valve 48 acts as a one way valve which allows flow of fluid from the rebound chamber 48 to the compression chamber 46 through a rebound flow passage 52 in the piston 42 during the rebound stroke of the suspension strut 10.

The rebound stop 34 comprises a substantially rigid metallic ring 54, and an annular resilient bumper 56, as can be seen in better detail in FIG. 2. The rebound stop 34 is positioned on the piston rod 18 between the piston assembly 16 and the rod guide 22. The annular resilient bumper 56 is positioned on the side of the rebound stop 34 directed towards the rod guide 22, and is preferably formed of elastomeric material. The rigid metallic ring 54 comprises an annular base portion 58 and an integral annular cylindrical portion 60. The annular base portion 58 is positioned adjacent the bumper 56, and the cylindrical portion 60 extends away from the bumper 56, that is, the cylindrical portion is directed towards the piston assembly 16. The rebound stop 34 is assembled on the piston rod 18 by welding or otherwise securing the cylindrical portion 60 to the piston rod 18 in any suitable manner. The base portion 58 has an undulating surface or otherwise non-flat surface for contacting the bumper 56.

Figure 12:
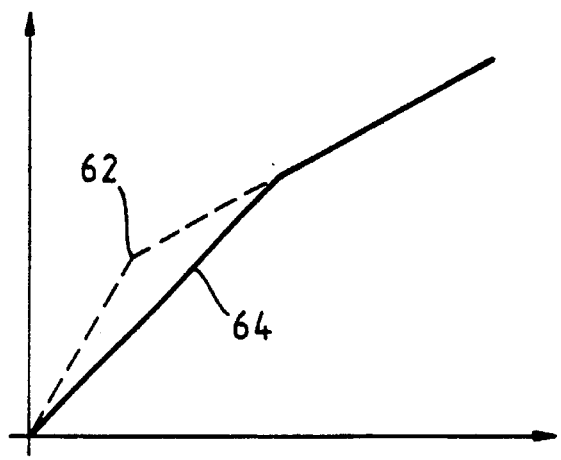
FIG. 12 is a graph of compression force against compression amount of a bumper of any of the embodiments of suspension strut in accordance with the present invention.

In use, during a rebound stroke of the suspension strut 10, the bumper 56 is engageable with the rod guide 22 and with the base portion 58 of the rigid ring 54 to limit the movement of the piston assembly 16 relative to the inner and outer tubes 14 and 12. The uneven surface of the base portion 58 of the rebound stop 34 alters the compression characteristics of the bumper 56 as shown in FIG. 12 from the normal compression characteristics (as defined above) shown by line 62 for a base portion having a flat surface to the characteristics shown by line 64. The smoother trace of line 64 indicates a reduction in noise (compared to an arrangement providing line 62) when the bumper 56 initially contacts the rod guide 22 and begins to be compressed between the rod guide and the base portion 58.

Figure 3:
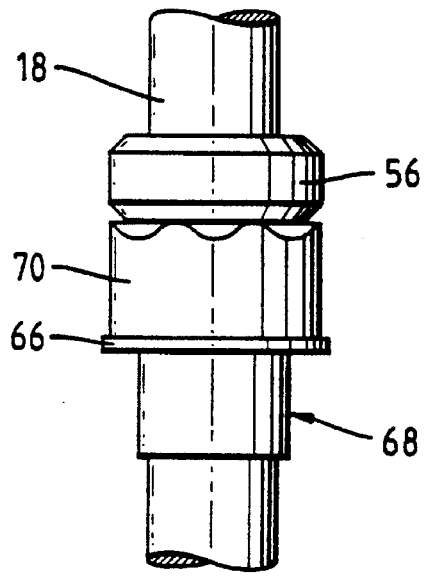
FIG. 3 is an enlarged side view of a rebound stop of a second embodiment of suspension strut in accordance with the present invention.

The alternative arrangement shown in FIG. 3 also provides the characteristics of line 64 of FIG. 12. In this arrangement, the base portion 66 of the metallic ring 68 has a substantially flat surface. However, an annular spacer 70, preferably of plastics material, is positioned between the base portion 66 and the bumper 56, and the surface of the annular spacer engageable by the bumper has an undulating or otherwise non-flat surface. The other features of the suspension strut partially shown in FIG. 3 are substantially the same as the suspension strut of FIG. 1.

Figure 4:
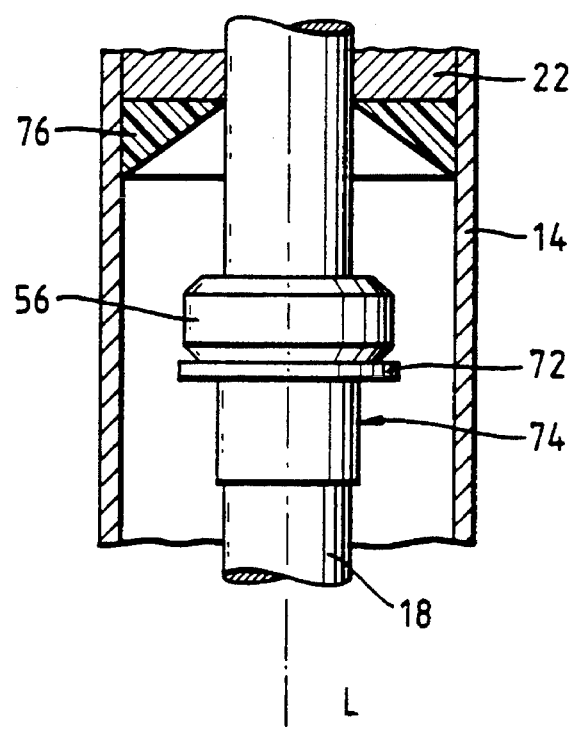
FIG. 4 is an enlarged side and cross-sectional view of a rebound stop and rod guide of a third embodiment of suspension strut in accordance with the present invention.

The further alternative arrangement shown in FIG. 4 also provides the characteristics of line 64 of FIG. 12. In this arrangement, the base portion 72 of the metallic ring 74 has a substantially flat surface. However, an annular spacer 76, preferably of plastics material, is positioned between the rod guide 22 and the bumper 56, and the surface of the annular spacer engageable by the bumper is at an acute angle to the axis L of the inner and outer tubes 14 and 12. The other features of the suspension strut partially shown in FIG. 4 are substantially the same as the suspension strut of FIG. 1.

Figure 5:
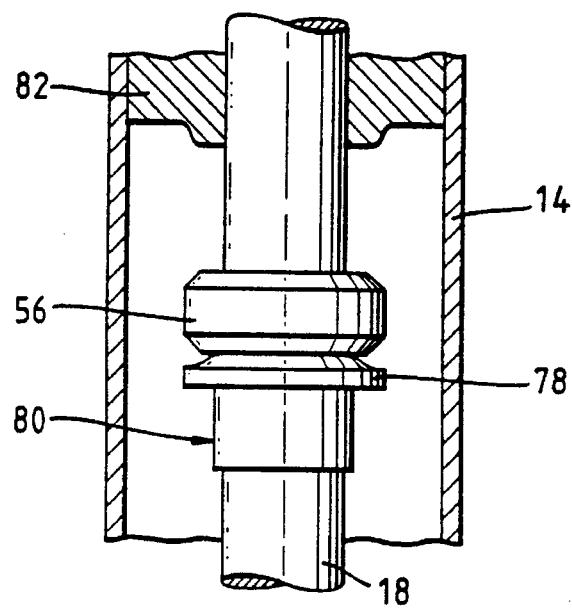
FIG. 5 is an enlarged side and cross-sectional view of a rebound stop and rod guide of a fourth embodiment of suspension strut in accordance with the present invention.
Figure 6:
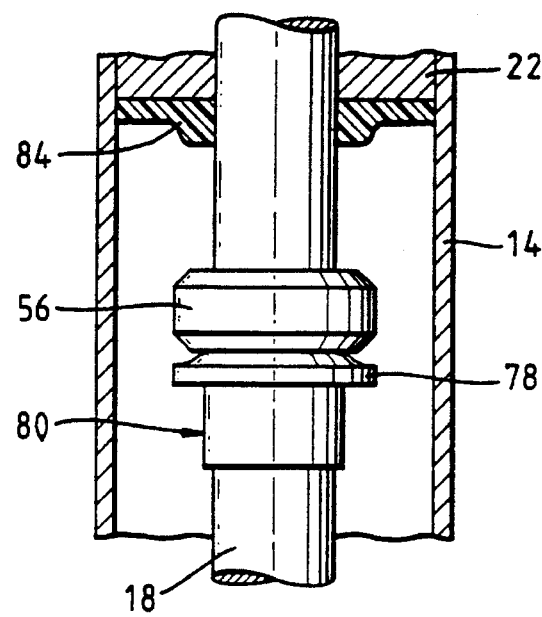
FIG. 6 is an enlarged side and cross-sectional view of a rebound stop and rod guide of a fifth embodiment of suspension strut in accordance with the present invention.

The still further alternative arrangement shown in FIG. 5 also provides the characteristics of line 64 of FIG. 12. In this arrangement, the base portion 78 of the metallic ring 80 has a non-flat surface and the surface on the rod guide 82 engageable by the bumper 56 is similarly uneven. The other features of the suspension strut partially shown in FIG. 5 are substantially the same as the suspension strut of FIG. 1. A modification to this arrangement is shown in FIG. 6 in which an insert 84, preferably of plastics material, provides the uneven surface on the rod guide 22.

Figure 7:
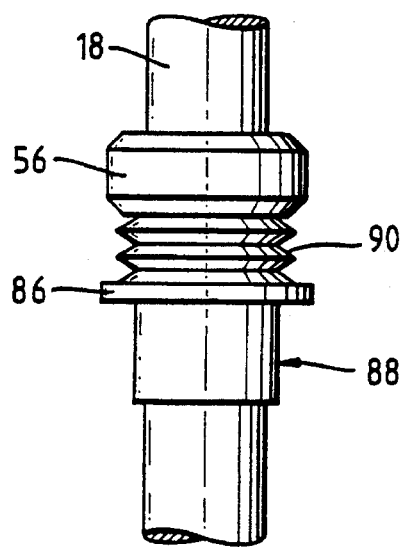
FIG. 7 is an enlarged side view of a rebound stop of a sixth embodiment of suspension strut in accordance with the present invention.
Figure 8:
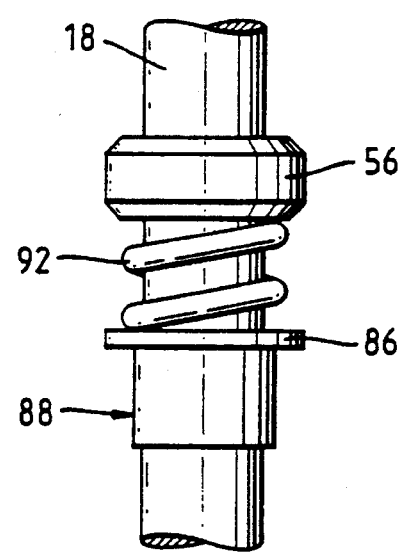
FIG. 8 is an enlarged side view of a rebound stop of a seventh embodiment of suspension strut in accordance with the present invention.
Figure 9:
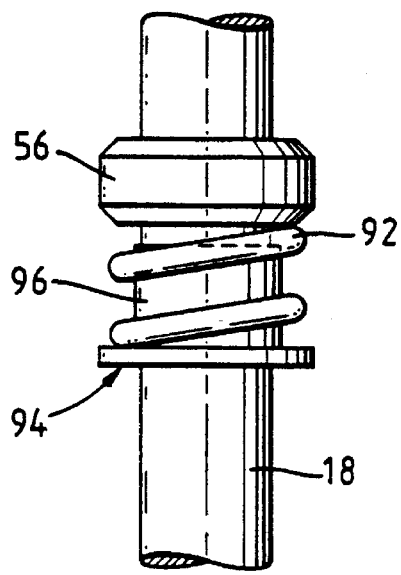
FIG. 9 is an enlarged side view of a rebound stop of an eighth embodiment of suspension strut in accordance with the present invention.

The alternative arrangement shown in FIG. 7 also provides the characteristics of line 64 of FIG. 12. In this arrangement, the base portion 86 of the metallic ring 88 has a substantially flat surface. However, annular spring discs 90 are positioned between the base portion 86 and the bumper 56. The other features of the suspension strut partially shown in FIG. 7 are substantially the same as the suspension strut of FIG. 1. In this arrangement, the resilience of the spring discs 90 modifies the initial compression characteristics of the rebound stop as indicated by line 64 of FIG. 12. The arrangement of FIG. 7 can be modified by replacing the spring disc by a coil spring 92 as shown in FIG. 8 to provide the characteristics of line 64 of FIG. 12. FIG. 9 shows a modification of the arrangement of FIG. 8 in which the mounting arrangement of the rigid metallic ring 94 is reversed such that the cylindrical portion 96 of the metallic ring is positioned inside the coil spring 92.

Figure 10:
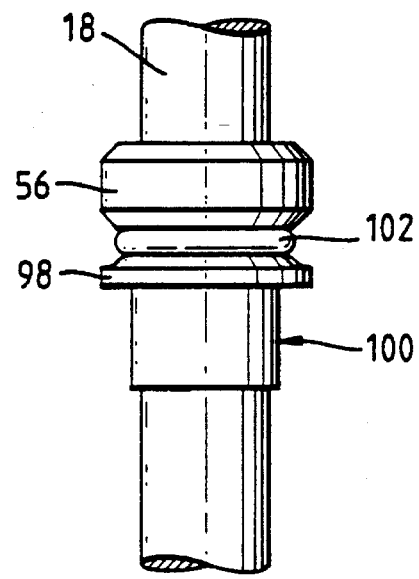
FIG. 10 is an enlarged side view of a rebound stop of a ninth embodiment of suspension strut in accordance with the present invention.
Figure 11:
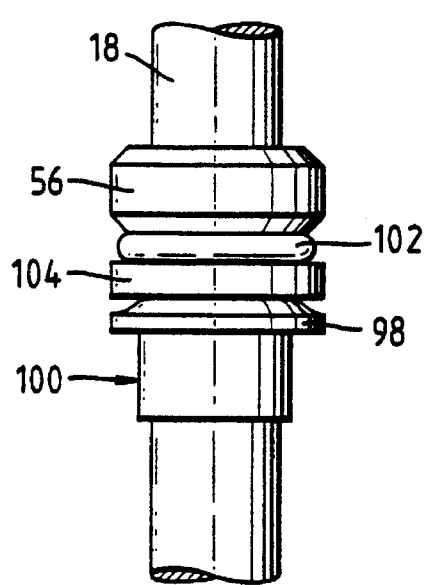
FIG. 11 is an enlarged side view of a rebound stop of a tenth embodiment of suspension strut in accordance with the present invention.

The further alternative arrangement of FIG. 10 also provides the characteristics of line 64 of FIG. 12. In this arrangement, the base portion 98 of the metallic ring 100 has a non-flat surface, and an elastomeric O-ring 102 is positioned between the base portion and the bumper 56. The arrangement of FIG. 10 is further modified as shown in FIG. 11 in which a spacer 104, preferably of plastics material, is positioned between the O-ring 102 and the base portion 98.

What is claimed is:

1. A suspension strut comprising:

a tube with an end;

a piston slidably mounted in the tube;

a piston rod attached to the piston and extending through the end of the tube;

a rebound stop disposed on the piston rod between the piston and the end of the tube including a substantially rigid ring and a resilient annular bumper of elastomeric material compressible between the substantially rigid ring and the end of the tube the resilient annular bumper having a normal compression characteristic when compressed between two substantially flat and parallel surfaces;

wherein at least one of the rebound stop and the end of the tube includes a circumferentially undulating surface that alters the normal compression characteristics of the bumper.

2. A suspension strut as claimed in claim 1 wherein the rebound stop further comprises a spacer positioned between the substantially rigid ring and the bumper.

3. A suspension strut as claimed in claim 1 wherein the rebound stop further comprises a spring positioned between the substantially rigid ring and the bumper.

4. A suspension strut as claimed in claim 1 wherein the rebound stop further comprises an O-ring positioned between the substantially rigid ring and the bumper.

5. A suspension strut comprising a tube substantially closed at both ends and containing fluid; a piston assembly slidably mounted in the tube and making a sealing fit therewith, the piston assembly separating a compression chamber and a rebound chamber within the tube; a piston rod attached to the piston assembly and extending through the rebound chamber and out one end of the tube; and a rebound stop mounted on the piston rod between the piston assembly and said one end of the tube, the rebound stop comprising a substantially rigid metallic ring secured to the piston rod and resilient annular bumper compressible between the metallic ring and the said one end of the tube during a rebound stroke wherein the bumper exhibits a force resisting compression that has a decreasing slope as a function of compression amount, wherein at least one of the rebound stop and the one end of the tube alter the normal compression characteristics of the bumper on initial contact and compression of the bumper reducing an initial slope of the force as a function of compression amount.

6. A suspension strut as claimed in claim 5, wherein the rebound stop comprises a circumferentially undulating surface adjacent the bumper which engages the bumper on initial contact and compression of the bumper.

7. A suspension strut as claimed in claim 5, wherein the substantially rigid metallic ring comprises an annular base portion, the annular base portion providing a circumferentially undulating surface adjacent the bumper which engages the bumper on initial contact and compression of the bumper.

8. A suspension strut as claimed in claim 6, wherein the rebound stop further comprises an annular spacer positioned between the rigid metallic ring and the bumper, the annular spacer providing the circumferentially undulating surface for contacting the bumper.

9. A suspension strut as claimed in claim 5, wherein the said one end of the tube comprises an uneven surface which engages the bumper on initial contact and compression of the bumper.

10. A suspension strut as claimed in claim 9, wherein the uneven surface is defined by an insert positioned adjacent said one end of the tube inside the rebound chamber.

11. A suspension strut as claimed in claim 6, wherein the said one end of the tube comprises an uneven surface which engages the bumper on initial contact and compression of the bumper.

12. A suspension strut as claimed in claim 11, wherein the uneven surface is defined by an insert positioned adjacent said one end of the tube inside the rebound chamber.

13. A suspension strut as claimed in claim 5, wherein the rebound stop further comprises an annular spring positioned between the rigid metallic ring and the bumper, the annular spring altering the effective normal compression characteristics of the bumper.

14. A suspension strut as claimed in claim 5, wherein the rebound stop further comprises an elastomeric O-ring positioned between the rigid metallic ring and the bumper, the O-ring providing a resilient mounting for the bumper thereby altering the effective normal compression characteristics of the bumper.

* * * * *